J. N. CALDWELL.
APPARATUS FOR MAKING REINFORCED FENCE POSTS OF PLASTIC MATERIAL.
APPLICATION FILED JULY 11, 1910.
1,025,508. Patented May 7, 1912.
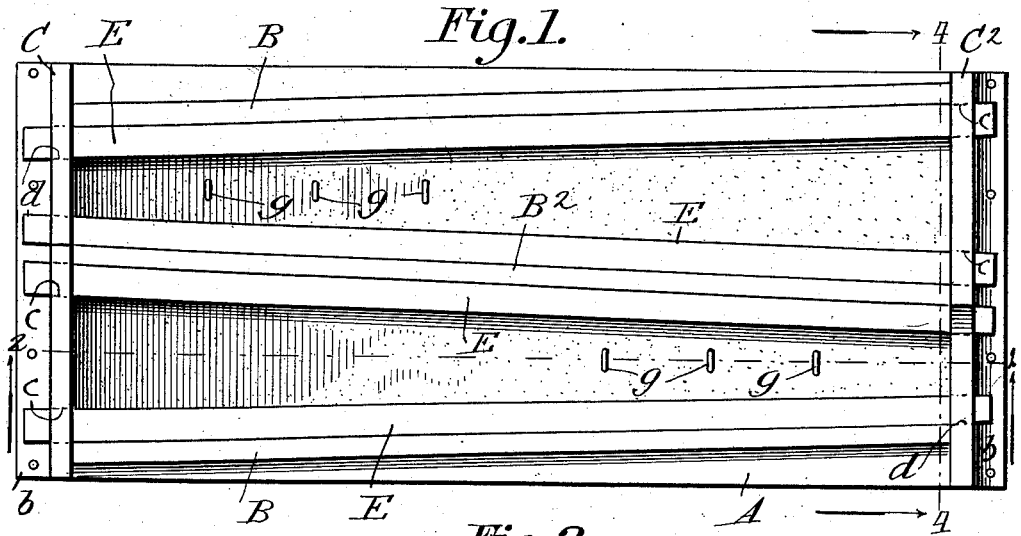
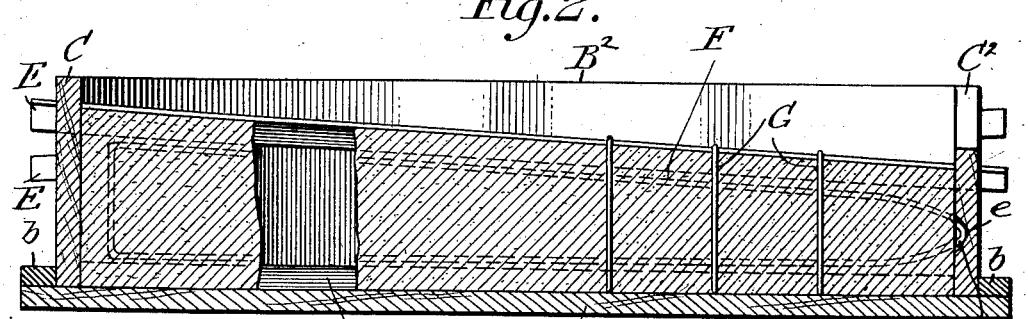
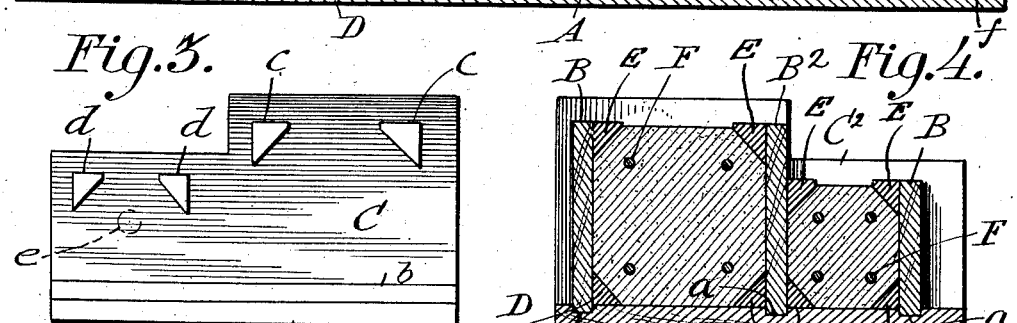
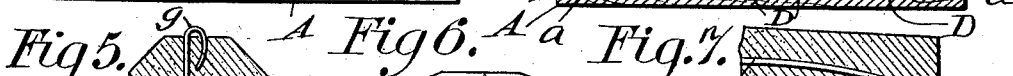
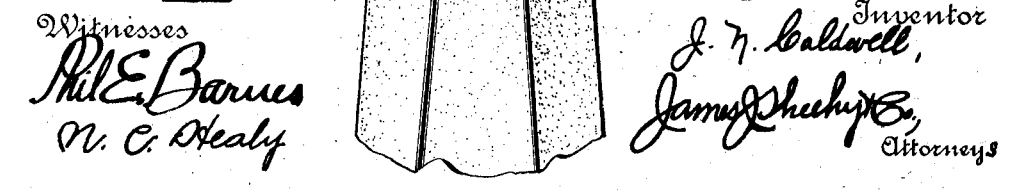

UNITED STATES PATENT OFFICE.

JACKSON N. CALDWELL, OF MANHATTAN, KANSAS.

APPARATUS FOR MAKING REINFORCED FENCE-POSTS OF PLASTIC MATERIAL.

1,025,508.  Specification of Letters Patent.  Patented May 7, 1912.

Application filed July 11, 1910. Serial No. 571,434.

*To all whom it may concern:*

Be it known that I, JACKSON N. CALDWELL, citizen of the United States, residing at Manhattan, in the county of Riley and State of Kansas, have invented new and useful Improvements in Apparatus for Making Reinforced Fence-Posts of Plastic Material, of which the following is a specification.

My invention pertains to apparatus for making reinforced fence posts of plastic material; and its novelty, utility and practical advantages will be fully understood from the following description and claim when the same are read in connection with the drawings, accompanying and forming part of this specification, in which:

Figure 1 is a plan illustrating the manner of making two fence posts in my novel apparatus at one time. Fig. 2 is a vertical longitudinal section, taken in the plane indicated by the line 2—2 of Fig. 1, and showing the fence post partly broken away. Fig. 3 is an elevation of one end of the apparatus. Fig. 4 is a transverse section taken in the plane indicated by the line 4—4 of Fig. 1, looking in the direction indicated by arrow. Fig. 5 is a section taken through one of the posts and illustrating one of the crosswise reinforcements and wire holders therein. Fig. 6 is a detail perspective view illustrative of the manner in which the bights of the main reinforcing loops in each post are brought together at the upper end of the post. Fig. 7 is a detail section illustrative of the said feature.

Similar letters designate corresponding parts in all of the views of the drawings, referring to which:

A is the base of my novel apparatus.

$B^2$ is a longitudinal wall seated in a longitudinal groove $a$ in the upper side of the base, and B, B, are longitudinal walls arranged at opposite sides of and spaced from the wall $B^2$ and seated in longitudinal grooves $a$ in the upper side of the base. The wall $B^2$ is of even height throughout its length, Fig. 2, while the walls B are tapered or gradually reduced in height from one end to the other. It will also be understood by reference to Fig. 4 that the walls B are reversely arranged—*i. e.*, the reduced or low end of one wall B is arranged at the same end of the apparatus as the high or unreduced end of the other wall B.

C $C^2$ are the end walls which are reversely arranged, as will be readily noted by comparison of Figs. 3 and 4, and are disposed at the inner sides of fixed cleats $b$. D D are corner bars, four in number, nailed or otherwise fixed to the base A, and E E are removable corner strips, four in number. Each of the end walls C and $C^2$ is provided with a pair of apertures $c$ and a pair of apertures $d$; the apertures $d$ being disposed at one side of and lower than the apertures $c$. It will also be noted that each end wall is provided at a point below its pair of apertures $d$ with a recess $e$; the said recess being in the inner side of the wall as clearly appears in Fig. 2.

In the practical use of my novel apparatus the end walls C $C^2$ are arranged at the inner sides of the cleats $b$, and the strips E are arranged in the manner shown—that is to say, one pair of strips E is passed through the higher apertures $c$ of the end wall $C^2$ and into the lower apertures $d$ of the end wall C, and the other pair of strips E is passed through the higher apertures $c$ of the end wall C and into the lower apertures $d$ of the end wall $C^2$. The concrete or other plastic material of which the posts are to be formed is then tamped in the apparatus up to a point flush with or adjacent the upper sides of the inclined strips E; the metallic reinforcements F and G being placed in position at the proper time and so that the bights $f$ of the reinforcements F rest in the before-mentioned recesses $e$ in the inner sides of the end walls C and $C^2$. After the placing and tamping of the concrete is completed, the formed posts are allowed to set, and when the same have hardened sufficiently, the end walls C $C^2$, and the strips E are removed, whereupon the posts may be expeditiously and easily lifted from between the side walls B and $B^2$.

By reason of the end walls C $C^2$ being reduced in height at one end and reversely arranged, and the walls B being reduced in height from one end to the other and reversely arranged, it will be manifest that the tapered posts may be very conveniently molded in the apparatus. It will also be manifest that by reason of the walls B being reduced in height from one end to the other and reversely arranged, the small ends of the formed posts can be readily lifted from between the walls B and the wall $B^2$.

It will be gathered from the foregoing that when my apparatus is operated in the manner described, two posts can be produced in practically one operation; and it will also be gathered that the operation of the apparatus is so simple that an ordinary laborer or farmer can use the apparatus to advantage after he is once taught the operation.

The main reinforcements F, of which there are two in each plastic post, are in the form of open frames or loops of heavy wire, and the said loops are arranged side by side for the greater portion of their length, while their bights $f$ are brought together and disposed in the recesses $e$ which serve to hold the bights $f$ in said relation until the concrete or other plastic material sets or hardens when it will serve to hold the bights $f$ together notwithstanding the tendency of the same to spring apart because of the resiliency of the loops. The reinforcements G of wire are also placed in position at the proper time incidental to the formation of the plastic posts, and said reinforcements G are provided at their ends with loops $g$ which are made to extend beyond one or two sides of each post.

When the posts are completed and set up ready for use, the bights $f$ may obviously be used for the connection of a crown fence wire, while the loops $g$ of the reinforcements G may be used for the connection of runner wires at points intermediate the ground and the upper ends of the posts.

While I have shown and described one form of my invention, it is to be understood that I am not limited to the details or the form or relative arrangement of parts disclosed, but that modifications may be made therein without departing from the spirit thereof.

Having described my invention, what I claim and desire to secure by Letters-Patent, is:

An apparatus for use in the production of posts of plastic material, comprising a base, three side walls arranged on the base; the intermediate side wall being of even height throughout its length, and the outer side walls being tapered in height from one end to the other and being reversely arranged, end walls reversely arranged on the base and removable therefrom and each having a high portion and a low portion and each also having a pair of apertures in its high portion and a pair of lower apertures in its low portion; the lower apertures of each end wall being arranged opposite the upper apertures of the other end wall, and four longitudinal strips removably arranged in the apertures of the end walls and so that each strip is disposed in one of the higher apertures of one end wall and in one of the lower apertures of the opposite end wall; each strip being also arranged directly against the adjacent side wall.

In testimony whereof I have hereunto set my hand in presence of two subscribing witnesses.

JACKSON N. CALDWELL.

Witnesses:
OLIVER C. BARNER,
WILLIAM E. SHERFEY.

---

Copies of this patent may be obtained for five cents each, by addressing the "Commissioner of Patents, Washington, D. C."